United States Patent Office 3,816,567
Patented June 11, 1974

3,816,567
PROCESS FOR PRODUCING BUTADIENE POLYMER
Yoshiharu Yagi, Toyonaka, Hiroshi Sato, Takatsuki, Shizuo Narisawa and Seimei Yasui, Ibaragi, Akira Kobayashi, Nishinomiya, and Minoru Hino and Kazuhiko Hata, Takatsuki, Japan, assignors to Sumitomo Chemical Company, Limited, Osaka, Japan
No Drawing. Filed Dec. 27, 1971, Ser. No. 212,664
Claims priority, application Japan, Dec. 28, 1970, 46/129,958, 46/129,961, 46/129,963; Dec. 29, 1970, 46/124,347, 46/124,349
Int. Cl. C08d 1/14, 3/06
U.S. Cl. 260—94.3         8 Claims

ABSTRACT OF THE DISCLOSURE

A process for producing butadiene polymer which comprises polymerizing 1,3-butadiene in the presence of novel catalyst systems. The produced butadiene polymer contains predominantly cis-1,4-structure.

The present invention relates to a process for producing butadiene polymer. More particularly, it relates to a process for producing butadiene polymer containing predominantly cis-1,4-structure by polymerization of 1,3-butadiene in the presence of a novel catalyst system.

For production of butadiene polymer of cis-1,4-structure, there have been known a variety of catalyst systems, of which typical examples are as follows: (1) a composition comprising a halogenated titanium compound and a trialkyl aluminum; (2) a composition comprising a halogenated cobalt compound and an alkyl aluminum halide and (3) a composition comprising a nickel or cobalt compound, a trialkyl aluminum and an inorganic halogenated compound.

Among these catalyst systems, a ternary catalyst system comprising a transition element of the Group VIII in the periodic table as a metal species, an organoaluminum compound and another compound as the third component, particularly belonging to the said composition (3), has been highly evaluated due to its high catalytic activity and various advantages on its practical use.

In such catalyst system, the compound available for the third component has much influences on the catalytic activity and on the stereoregularity as well as the physical properties of the product.

As the result of the study on various catalyst systems for polymerization of 1,3-butadiene, there has been found a novel catalyst system which has a high catalytic activity in polymerization and can afford a rubber-like polymer containing predominantly cis-1,4-structure.

According to the present invention, there is provided a process for producing butadiene polymer containing predominantly cis-1,4-structure which comprises polymerizing 1,3-butadiene in the presence of a catalyst system selected from the group consisting of:

(I) a catalyst system comprising:
  (A) at least one of nickel compounds,
  (B) a trialkylaluminum compound,
  (C) at least one of the benzotrifluoride compounds represented by the formula:

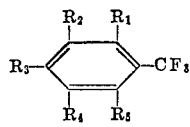

wherein $R_1$, $R_2$, $R_3$, $R_4$ and $R_5$ are each hydrogen, halogen, alkyl or fluoroalkyl, and (D) at least one member selected from the group consisting of:
  (D-1) water,
  (D-2) halogenated aliphatic alcohols,
  (D-3) phenols, naphthols and their halogen derivatives,
  (D-4) aliphatic or aromatic aldehydes and their halogen derivatives, and
  (D-5) aromatic polycarboxylic anhydrides and their halogen derivatives;

(II) a catalyst system comprising:
  (A) at least one of nickel compounds,
  (E) a dialkylaluminum monofluoride compound, and
  (F) at least one member selected from the group consisting of:
    (F-1) water,
    (F-2) phenols of the formula:

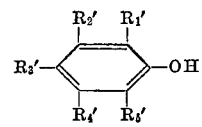

wherein $R_1'$, $R_2'$, $R_3'$, $R_4'$ and $R_5'$ are each hydrogen, chlorine, bromine or iodine or one combination of adjacent two of $R_1'$ to $R_5'$ may represent an aromatic condensed ring, (F-3) alcohols of the formula:

$$Rx_1\text{—OH}$$

wherein $Rx_1$ is alkyl substituted with chlorine,
(F-4) ketones of the formula:

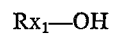

wherein $Rx_2$ and $Rx_3$ are each alkyl or phenyl substituted with chlorine,
(F-5) aldehydes of the formula:

$$Rx_4\text{—CH=O}$$

wherein $Rx_4$ is alkyl or phenyl substituted or not with chlorine, bromine or iodine,
(F-6) carboxylic acids of the formula:

$$Rx_5\text{—COOH}$$

wherein $Rx_5$ is alkyl or phenyl substituted with chlorine, and
(F-7) carboxylic anhydrides of the formula:

$$(Rx_6\text{—CO})_2O$$

wherein $Rx_6$ is alkyl or phenyl substituted with chlorine; and (III) a catalyst system comprising:
  (A) at least one of nickel compounds,
  (B) a trialkylaluminum compound, and
  (G) at least one member selected from the group consisting of:
    (G-1) alkenes of the formula:

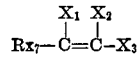

wherein $Rx_7$ is lower alkyl of 1 to 6 carbon atoms having at least one fluorine atom on the carbon atom adjacent to the double bond and $X_1$, $X_2$ and $X_3$ are each hydrogen, halogen or lower alkyl of 1 to 3 carbon atoms,
(G-2) the ketones (F-4) and their ketals and hemiketals, and
(G-3) the aldehydes (F-5) and their acetals and hemiacetals.

In the significances of the symbols as stated above, the alkyl moiety is intended to indicate the one having 1 to 8 carbon atoms, unless otherwise defined.

Hitherto, there are known the following ternary catalyst systems: a catalyst system comprising an organic acid salt of nickel, a trialkyl aluminum and boron trifluoride etherate [Japanese Pat. 8,193/1962], a catalyst system comprising an organic acid salt of nickel, an organometallic compound in which the metal belongs to Groups I to III in the Periodic Table and an anhydrous metal fluoride [U.S. Pat. 3,446,788], a catalyst system comprising an organic acid salt of nickel, an organometallic compound in which the metal belongs to Groups I to III in the Periodic Table and a boron trifluoride complex [U.S. Pat. 3,483,177], a catalyst system comprising an organic acid salt of nickel, an organometallic compound in which the metal belongs to Groups I to III in the Periodic Table and hydrogen fluoride [French Pat. 1,573,934] and a catalyst system comprising a nickel compound, an organic aluminum compound and an acidic metal halide [U.S. Pat. 3,066,127]. All these contain an inorganic compound or its complex as the third component. Different from them, the third or fourth component in the catalyst systems of the invention is water or an organic compound.

Besides, there is also known a ternary catalyst system comprising a nickel compound, an organometallic compound in which the metal belongs to Groups I to III in the Periodic Table and an organic fluorine compound, phosphoryl fluoride or a sulfuric ester containing a perfluoroalkyl group [German Pat. 2,017,006]. This catalyst system contains a special fluorine-containing compound as the third component. Although one of the catalyst systems of the invention contains a compound having a fluorine atom, it is structurally different from the one used in the said known catalyst system and characteristic in affording polybutadiene containing a cis-1,4-structure in a high rate.

Also, there are known some binary catalyst systems such as a catalyst system comprising a $\pi$-allyl type complex of a transition metal belonging to Groups IV to VIII in the Periodic Table and an organic electron acceptor [U.S. Pat. 3,468,866; British Pat. 1,172,013] or a catalyst system comprising a $\pi$-alkenyl compound of a transition metal of Groups IV to VIII in the Periodic Table and a p-benzoquinone derivative [British Pat. 1,132,425]. For preparation of the $\pi$-allyl or $\pi$-alkenyl type transition metal compound as one of the essential components in these catalyst systems, a highly skillful technique is required. The catalyst systems of the invention are all ternary and can be produced without any troublesome work.

The catalyst systems of the invention have a quite high catalytic activity and can be employed in a small amount or a low concentration in the polymerization. Further, in the polymerization using the catalyst systems of the invention, the gel formation due to generation of heat during the reaction and the inferior stereoregularity of the polymer caused thereby as usually seen in case of using a highly active catalyst system are never observed. Furthermore, the catalyst systems can be prepared with ease compared with the conventional catalyst systems. Moreover, the molecular weight of the polymer to be produced in the polymerization can be appropriately controlled by adopting a suitable condition for the preparation of the catalyst systems. The produced polymer shows a high content of cis-1,4-structure.

Examples of the components which are used in the catalyst system (I) of the invention are as follows:

As the nickel compounds, there may be employed the one(s) selected from various salts and organic complex compounds of nickel such as organic acid salts of nickel (e.g. nickel acetate, nickel naphthenate, nickel octanoate), complex compounds of nickel salts (e.g. nickel chloride-pyridine complex, tris(dipyridyl)nickel chloride, bis(ethylenediamine)-nickel sulfate) and organic coordination compounds of nickel or nickel chelate compounds (e.g. bis - dimethylglyoxymato nickel, bis - ethylacetoacetate nickel, bis-acetylacetonate nickel).

Examples of the trialkyl aluminum compound include trimethyl aluminum, triethyl aluminum, tri-n-butyl aluminum, triisobutyl aluminum and tri-n-hexyl aluminum.

Examples of the benzotrifluoride compound [I] are benzotrifluoride,
2-chlorobenzotrifluoride,
3-chlorobenzotrifluoride,
4-chlorobenzotrifluoride,
2-bromobenzotrifluoride,
3-bromobenzotrifluoride,
4-bromobenzotrifluoride,
2,5-dichlorobenzotrifluoride,
3,4-dichlorobenzotrifluoride,
2,3-dibromobenzotrifluoride,
2,5-difluorobenzotrifluoride,
3,5-difluorobenzotrifluoride,
2-methylbenzotrifluoride,
3-methylbenzotrifluoride,
4-methylbenzotrifluoride,
2-hexylbenzotrifluoride,
4-hexylbenzotrifluoride,
2-dodecylbenzotrifluoride,
4-dodecylbenzotrifluoride
2-monofluoromethylbenzotrifluoride,
3-difluoromethylbenzotrifluoride,
1,3-bis(trifluoromethyl)benzene,
3-(3'-fluoropropyl)benzotrifluoride,
4-(2',3'-difluoropropyl)benzotrifluoride,
1,3,5-tris(trifluoromethyl)benzene,
2-methyl-4-chlorobenzotrifluoride,
3-bromo-4-ethylbenzotrifluoride,
2-methyl-4-trifluoromethylbenzotrifluoride,
3-fluoro-4-trifluoromethylbenzotrifluoride,
etc.

Examples of the halogenated aliphatic alcohol are trifluoromethyl alcohol,
trichloromethyl alcohol,
2,2,2-trifluororethyl alcohol,
2,2,2-trichloroethyl alcohol,
2,2-difluoroethyl alcohol,
2,2-dichloroethyl alcohol,
2,2,3,3-tetrafluoro-1-propanol,
2,2,3,3-tetrachloro-1-propanol,
2,2,3,3,4,4,5,5-octafluoro-1-pentanol,
2,2,3,3,4,4,5,5-octachloro-1-pentanol,
2,2,3,3,4,4,5,5,6,6,7,7-dodecafluoroheptanol,
2,2,3,3,4,4,5,5,6,6,7,7-dodecachloroheptanol,
etc.

As the phenol, there may be exemplified phenol, 2-chlorophenol, 3-chlorophenol, 4-chlorophenol, 2,4-dichlorophenol, 2,4,6-trichlorophenol, pentachlorophenol, 2-bromophenol, 3-bromophenol, 2,4-dibromophenol, 2,4,6-tribromophenol, pentabromophenol, $\alpha$-naphthol, $\beta$-naphthol, halogenated $\alpha$-naphthol and halogenated $\beta$-naphthol.

Examples of the aliphatic or aromatic dicarboxylic acids are oxalic acid, malonic acid, succinic acid, glutaric acid, adipic acid, pimelic acid, suberic acid, azelaic acid, sebacic acid, phthalic acid, isophthalic acid, terephthalic acid, etc.

Examples of the aliphatic or aromatic aldehydes are formaldehyde,
acetaldehyde,
propionaldehyde,
n-butyric aldehyde,
isobutyric aldehyde,
n-valeraldehyde,
n-caproic aldehyde,
n-heptaldehyde,
acrolein, crotonaldehyde,
benzaldehyde,
salicylaldehyde,
p-hydroxybenzaldehyde,
vanillin,
phenylacetaldehyde,
cinnamaldehyde,
trifluoroacetaldehyde,
3,3,3-trifluoropropionaldehyde,
2,2,3,3-tetrafluorobenzaldehyde,
perfluoropropionaldehyde,
4,4,4-trifluorobutyric aldehyde,
2,2-difluorobutyric aldehyde,
2,2,3,3-tetrafluorobutyric aldehyde,
perfluorobutyric aldehyde,
o-trifluoromethylbenzaldehyde,
m-trifluoromethylbenzaldehyde,
p-trifluoromethylbenzaldehyde,
perfluorobenzaldehyde,
trichloroacetaldehyde,
3,3,3-trichloropropionaldehyde,
tribromoacetaldehyde,
2,2-dichlorobenzaldehyde,
2,2-dibromobenzaldehyde,
perchlorobutyric aldehyde,
perbromobenzaldehyde,
etc.

Examples of the aromatic polycarboxylic anhydride are phthalic anhydride, tetrachlorophthalic anhydride, tetrafluorophthalic anhydride, tetrabromophthalic anhydride, tetraiodophthalic anhydride, pyromellitic anhydride, dichloropyromellitic anhydride, difluoropyromellitic anhydride, dibromopyromellitic anhydride, trimellitic anhydride, etc.

Examples of the components which are used in the catalyst system (II) of the invention are as follows:

Examples of the nickel compound are the same as in the catalyst system (I).

Examples of the dialkyl aluminum monofluoride compound are dimethyl aluminum monofluoride, diethylaluminum monofluoride, diisopropylaluminum monofluoride, di-n-butylaluminum monofluoride, diisobutylaluminum monofluoride and di-n-hexylaluminum monofluoride. Examples of the trialkyl aluminum compound are trimethylaluminum, triethylaluminum, triisopropylaluminum, tri-n-butylaluminum, triisobutylaluminum and tri-n-hexylaluminum.

Instead of the dialkylaluminum monofluoride compound, there may be employed a compound obtained by the reaction of the trialkylaluminum compound and an aliphatic or aromatic carboxylic acid fluoride. Examples of the aliphatic or aromatic carboxylic acid fluoride to be reacted with the trialkylaluminum compound are acetyl fluoride, propionyl fluoride, n-butyryl fluoride, isobutyryl fluoride, n-valeryl fluoride, caproyl fluoride, benzoyl fluoride, o-chlorobenzoyl fluoride, m-chlorobenzoyl fluoride, p-chlorobenzoyl fluoride and 2,4,6-trichlorobenzoyl fluoride.

As the phenols, there may be exemplified phenol, 2-chlorophenol, 3-chlorophenol, 4-chlorophenol, 2,4-dichlorophenol, 3,5 - dichlorophenol, 2,4,6 - trichlorophenol, pentachlorophenol, 2-bromophenol, 3-bromophenol, 2,4-dibromophenol, 2,4,6-tribromophenol, pentabromophenol, α-naphthol, β-naphthol, halogenated α-naphthol and halogenated β-naphthol.

Examples of the alcohol include trichloromethyl alcohol,
2,2,2-trichloroethyl alcohol,
2,2-dichloroethyl alcohol,
2,2,3,3-tetrachloro-1-propanol,
2,2,3,3,4,4,5,5-octachloro-1-pentanol, and
2,2,3,3,4,4,5,5,6,6,7,7-dodecachloroheptanol.

Examples of the ketone are
perchloroacetone,
1,1,1,3-tetrachloro-3,3-dibromoacetone,
1,1,1,3-tetrachloroacetone,
1,1,1-trichloroacetone,
1,1-dichloroacetone,
perchloromethyl ethyl ketone,
trichloromethyl phenyl ketone,
1,3-dibromo-1,1,3,3-tetrachloroacetone,
1,3-dichloroacetone,
hexachloroacetone, and
decachlorobenzophenone.

Examples of the aldehyde are
formaldehyde,
acetaldehyde,
propionaldehyde,
n-butyraldehyde,
isobutyraldehyde,
acrolein,
benzaldehyde,
p-hydroxybenzaldehyde,
trichloroacetaldehyde,
tribromoacetaldehyde,
triiodoacetaldehyde,
3,3,3-trichloropropionaldehyde,
3,3,3-tribromopropionaldehyde,
3,3,3-triiodopropionaldehyde,
2,2,3,3-tetrachlorobenzaldehyde,
2,2,3,3-tetrabromobenzaldehyde,
2,2,3,3-tetraiodobenzaldehyde,
perchlorobenzaldehyde,
perbromobenzaldehyde,
periodobenzaldehyde,
4,4,4-trichlorobutyraldehyde,
4,4,4-tribromobutyraldehyde,
4,4,4-triiodobutyraldehyde,
perchlorobutyraldehyde,
perbromobutyraldehyde,
periodobutyraldehyde,
o-trichloromethylbenzaldehyde, and
o-tribromomethylbenzaldehyde.

Examples of the carboxylic acid include
monochloroacetic acid,
dichloroacetic acid,
trichloroacetic acid,
2,2,3,3,-tetrachloropropionic acid,
2,2-dichloropropionic acid,
α-chloropropionic acid,
β-chloropropionic acid,
3,3,3-trichloropropionic acid,
perchloropropionic acid,
perchloro-n-butyric acid,
α-methyl-n-butyric acid,
β-chloro-n-butyric acid,
perchloroiso-butyric acid,
2,2,3,3,4,4,5,5-octachloro-n-valeric acid,
α-chlorocaproic acid,
perchlorocaproic acid,
o-chlorobenzoic acid,
m-chlorobenzoic acid,
p-chlorobenzoic acid,
2,4-dichlorobenzoic acid,
2,5-dichlorobenzoic acid,
2,6-dichlorobenzoic acid,
3,4-dichlorobenzoic acid,
3,5-dichlorobenzoic acid, and
tetrachlorophthalic acid.

The carboxylic anhydride may be the one corresponding to the carboxylic acid as exemplified above.

Examples of the components which are used in the catalyst system (III) of the invention are as follows:

Examples of the nickel compound and the trialkylaluminum compound are the same as in the catalyst system (I).

Examples of the alkene include 1,1,2,3,3-pentafluoro-3-bromopropylene,
1,1,2,3,3-pentafluoro-3-chloropropylene,
1,2-dichloro-3,3-difluoropropylene,
1,1,3,3,3-pentafluoro-2-chloropropylene,
1,2,3,3,3-pentafluoro-1-chloropropylene,
1,1,2-trichloro-3,3,3-trifluoropropylene,
1,1,3,3-tetrafluoro-3-bromopropylene,
1-iodo-3,3,3-trifluoropropylene,
1,1,1,4,4,4-hexafluoro-2,3-dibromobutene-2,
1,1,1,2,4,4,4-heptafluoro-3-chlorobutene-2,
1,1,2,3,3-pentafluoro-4,4-dichloro-4-iodobutene-1,
1,1-dichloro-2-methyl-3,3,3-trifluoropropylene,
1,1,1,4,4,5,5,5-octafluoro-3-iodopentene-2,
1,1-difluoro-1-bromo-2-methylpentene-2,
perfluorohexene,
perfluorononene,
etc.

Examples of the acetal and hemiacetal of the aldehyde and the ketal and hemiketal of the ketone are trichloroacetaldehyde acetal, tribromoacetaldehyde acetal, trichloroacetaldehyde hemiacetal, tribromoacetaldehyde hemiacetal, etc.

The catalytic activity of the catalyst systems of the present invention is varied depending on the mixing ratio of the components, the mixing order of the components, the concentration of each compound, the temperature during the preparation of the catalyst system and the like. Of these, the mixing ratio of the components has particularly a great influence on the catalytic activity.

In the catalyst system (I), the molar ratios of the trialkylaluminum compound to the nickel compound (i.e. (B)/(A)), the benzotrifluoride compound to the trialkylaluminum compound (i.e. (C)/(B)), water to the trialkylaluminum compound (i.e. (D)/(B)) and the halogenated aliphatic alcohol, the phenol and naphthol and their halogen derivative, the aliphatic or aromatic aldehyde and its halogen derivative and/or the aromatic polycarboxylic anhydride and its halogen derivative to the trialkylaluminum compound (i.e. (D)/(B)) may vary in the range from 0.5 to 1000 (preferably from 1.0 to 100), from 0.1 to 100 preferably from 0.2 to 10), from 0.25 to 1.5 and from 0.05 to 20 (perferably from 0.1 to 10), respectively.

In the catalyst system (II), the molar ratios of the dialkylaluminum monofluoride compound to the nickel compound (i.e. (E)/(A)) and the third component to the dialkylaluminum monofluoride compound (i.e. (F)/(E)) may vary in the range from 0.5 to 1000 (preferably from 1.0 to 100) and from 0.05 to 20 (preferably from 0.1 to 10), respectively.

In the catalyst system (III), the molar ratios of the trialkylaluminum compound to the nickel compound (i.e. (B)/(A)) and the third component to the trialkylaluminum compound (i.e. (G)/(B)) may vary in the range from 0.5 to 1000 preferably from 1.0 to 100) and from 0.05 to 20 (preferably from 0.1 to 10), respectively.

The nickel compound in the said catalyst systems may be used in an amount of from 0.0005 to 2.0 mmol (preferably from 0.01 to 1.0 mmol) based on 1 mol of monomer 1,3-butadiene.

With the increase of the molar ratio of water to the trialkylaluminum compound or the dialkylaluminum monofluoride compound, the molecular weight of the produced polymer in the polymerization becomes higher. The catalytic activity is increased with the increase of the molar ratio and reaches its maximum at a ratio of around 1.0 but is decreased with the further increase of the molar ratio. On the other hand, with the increase of the molar ratio of the trialkyl aluminum compound to the nickel compound, the catalytic activity is increased, and the molecular weight of the polymer becomes smaller therewith. Thus, the polymerization rate and the molecular weight of the polymer can be intentionally regulated by varying the molar ratio of the components of the catalyst system and the concentration of the catalyst system, while maintaining a high content of the cis-1,4-structure.

By the use of a larger amount of the catalyst system in the polymerization reaction, the polymerization rate is increased and the molecular weight of the produced polymer is decreased, as seen in case of the generally accepted Ziegler-Natta type catalysts.

The mixing of each of the components for preparation of the catalyst system can be accomplished in any optional order and is ordinarily carried out in the presence of a diluent. For obtaining the catalyst systems with a higher activity, the nickel compound and the trialkylaluminum compound or the dialkylaluminum monofluoride compound may be allowed to contact each other in the presence of a small amount of an aliphatic conjugated diene (e.g. 1,3-butadiene, isoprene, dimethylbutadiene). Such technique will prevent the formation of insoluble material during the preparation and can thus minimize the harmful influence caused by contamination with a small amount of impurity in the polymerization reaction system.

The preparation of the catalyst systems may be executed at a temperature from —80 to 70° C., preferably from —20 to 30° C. For instance, in case of the catalyst system (I), it is favorable that, prior to admixing with the other components, the trialkyl aluminum compound and the benzotrifluoride compound are reacted to a certain extent by heating at a temperature from 30 to 150° C. After all of the components are mixed completely, the resultant mixture is preferred to be aged at a temperature from 0 to 100° C. By changing the aging conditions, the catalytic activity may be controlled.

Typical examples of the concrete procedures for preparation of the catalyst system (I) of the invention are as follows: admixing the trialkylaluminum compound with the benzotrifluoride compound in a diluent, heating the mixture at a suitable temperature, adding thereto a small amount of 1,3-butadiene while ice-cooling, adding further the nickel compound and the component (D) in this order or in the reversed order and finally aging the resulting mixture at an appropriate temperature; dissolving or suspending the nickel compound with the component (D) in a diluent, adding thereto a small amount of 1,3-butadiene while ice-cooling, adding further a previously prepared solution of the trialkylaluminum compound and the benzotrifluoride compound in a diluent and finally aging the resulting mixture at an appropriate temperature; dissolving or suspending the nickel compound and the component (D) in a diluent, adding thereto a small amount of 1,3-butadiene while ice-cooling, adding further the trialkylaluminum compound and the benzotrifluoride compound in this order and finally aging the resulting mixture at an appropriate temperature.

A typical example of the concrete procedures for preparation of the catalyst system (II) of the invention are as follows: admixing the dialkylaluminum monofluoride compound (E) with a diluent, adding thereto a small amount of 1,3-butadiene while ice-cooling, adding further the nickel compound (A) and the component (F) in this order or in the reversed order and finally aging the resulting mixture at an appropriate temperature. Another typical example is as follows: admixing the nickel compound (A) with the component (F) in a diluent, adding thereto a small amount of 1,3-butadiee while ice-cooling, adding further the dialkylaluminum monofluoride compound (E) and finally aging the resulting mixture at an appropriate temperature. A further typical example is as follows: admixing the dialkylaluminum monofluoride compound (E) with the component (F) in a diluent, adding thereto a small amount of 1,3-butadiene while ice-cooling, adding further the nickel compound (A) and finally aging the resulting mixture at an appropriate temperature.

The polymerization is carried out by contacting 1,3-butadiene with the catalyst system in a liquid medium at a temperature from −30 to 150° C., preferably from 0 to 100° C. The catalyst system and 1,3-butadiene may be supplied to the reaction system in an optional order in the presence or absence of the liquid medium.

In the polymerization of 1,3-butadiene according to the present invention, the reaction is effected under the environment substantially free from any inhibitive material which is occasionally encountered with the generally accepted Ziegler-Natta type catalysts.

Examples of the solvent as the diluent for the catalyst system and/or as the reaction medium for the polymerization include aromatic hydrocarbons (e.g. benzene, toluene, xylene), aliphatic hydrocarbons (e.g. hexane, heptane, benzin), alicyclic hydrocarbons (e.g. cyclohexane, Decalin), hydrogenated aromatic hydrocarbons (e.g. tetralin), etc.

The intrinsic viscosity of butadiene polymer can be widely varied depending on the conditions during the preparation of the catalyst system and/or the polymerization.

The recovery of the produced polymer from the reaction mixture may be performed in a per se conventional manner. For instance, the reaction mixture is poured into a large amount of aqueous or alcoholic medium such as methanol, isopropanol, methanol-acetone or hot water, if necessary, with previous addition of an antioxidant (e.g. phenol - β-naphthylamine, 2,6-di-tert-butyl-p-cresol), and then the precipitate is collected and washed with methanol to obtain a substantially colorless rubber-like polymer.

The butadiene polymer produced by the present invention is a rubber-like solid or highly viscous material. The analysis of the micro structure according to the infrared absorption method reveals the presence of cis-1,4 structure in most butadiene units.

Practical and presently preferred embodiments of the present invention are illustratively shown in the following examples wherein the intrinsic viscosity of the polymer is measured in a toluene solution at 30° C., the micro structure of the polymer is determined from the infrared absorption spectrum according to the Morero's method [D. Morero et al.: Chim. e Ind., 41, 758 (1959)] and the gel content is determined as follows: polybutadiene (1.0 g.) is well admixed with toluene (20 ml.), and the mixture is, after 1 day, filtered by the aid of a wire screen (300 mesh). The residual substance is dried and weighed as the gel component.

EXAMPLE 1

In a glass made polymerization tube, there is charged a solution prepared by heating triethyl aluminum (0.4 mmol) and benzotrifluoride (0.4 mmol) in toluene (2.0 ml.) at 70° C. for 30 minutes. A solution of 1,3-butadiene (4.0 mmol) in toluene (5.0 ml.) and a solution of nickel naphthenate (0.04 mmol) in toluene (1.5 ml.) are added thereto in this order, and the resulting mixture is stirred at 25° C. for 30 minutes. After further addition of a designed amount of moistened toluene containing 550 p.p.m. of water, the volume of the mixture is adjusted to 130 ml. with anhydrous toluene. The mixture is cooled to −10° C., and 1,3-butadiene (20 g.) is added thereto. Then, the polymerization tube is sealed. In the foregoing procedure, the whole operations are effected in a nitrogen stream. The polymerization tube is placed into a rotary constant temperature bath of 40° C., and polymerization is executed for a designed time. Then, the reaction mixture is poured into methanol containing a small amount of 2,6-di-t-butyl-p-cresol to stop the polymerization whereby the polymer is precipitated. The polymer is separated and dried at room temperature in vacuo.

The yield and the physical properties of the produced polymer are shown in Table 1.

TABLE 1

| No. | Molar ratio of water to triethyl aluminum | Polymerization time (hrs.) | Polymerization product | | | | |
|---|---|---|---|---|---|---|---|
| | | | Yield (percent) | $[\eta]$ (dl./g.) | Micro structure (percent) | | Gel content (percent) |
| | | | | | Cis-1,4 | Trans-1,4 | 1,2 | |
| 1 | 0 | 10.0 | 0 | | | | | |
| 2 | 0.10 | 10.0 | 0.1 | | | | | |
| 3 | 0.25 | 5.0 | 5.0 | 1.00 | 97.5 | 0.5 | 2.0 | 2.0 |
| 4 | 0.35 | 5.0 | 7.0 | 1.42 | 98.0 | 0.5 | 1.5 | 1.5 |
| 5 | 0.50 | 3.0 | 42.5 | 2.75 | 98.2 | 0.7 | 1.1 | 1.1 |
| 6 | 1.00 | 3.0 | 80.3 | 3.35 | 9.85 | 0.5 | 2.0 | 1.0 |
| 7 | 1.20 | 3.0 | 70.2 | 4.02 | 98.3 | 0.6 | 1.1 | 1.1 |
| 8 | 1.50 | 3.0 | 40.4 | 4.13 | 97.6 | 0.7 | 1.7 | 1.7 |
| 9 | 2.00 | 10.0 | 0.3 | | | | | |

EXAMPLE 2

In a glass made polymerization tube, there is charged a solution prepared by heating equimolar amounts of triethyl aluminum and benzotrifluoride in toluene at 70° C. for 30 minutes. A solution of 1,3-butadiene (4.0 mmol) in toluene (1.5 ml.) and a solution of nickel naphthenate (0.04 mmol) in toluene (0.4 ml.) are added thereto in this order, and the resulting mixture is stirred at 25° C. for 30 minutes. Moistened toluene containing 550 p.p.m. of water is added thereto in such an amount that the molar ratio of water to triethyl aluminum becomes 1.0, and the volume of the mixture is adjusted to 130 ml. with anhydrous toluene. The mixture is cooled to −10° C., and 1,3-butadiene (22 g.) is added thereto. Then, the polymerization tube is sealed. In the foregoing procedure, the whole operations are effected in a nitrogen stream. The polymerization tube is placed into a rotary constant temperature bath of 40° C., and polymerization is executed for 3 hours. The reaction mixture is then treated in the same manner as in Example 1.

The results are shown in Table 2.

TABLE 2

| No. | Amount (mmol) | | | Molar ratio of triethyl aluminum to nickel naphthenate | Molar ratio of water to triethyl aluminum | Polymerization time (hrs.) | Polymerization product | | | | |
|---|---|---|---|---|---|---|---|---|---|---|---|
| | Nickel naphthenate | Triethyl aluminum | Benzotrifluoride | | | | Yield (percent) | $[\eta]$ (dl./g.) | Micro structure (percent) | | |
| | | | | | | | | | Cis-1,4 | Trans-1,4 | 1,2 |
| 1 | 0.04 | 0.3 | 0.3 | 7.5 | 1.0 | 3.0 | 17.5 | 4.75 | 98.2 | 1.0 | 0.8 |
| 2 | 0.04 | 0.4 | 0.4 | 10.0 | 1.0 | 3.0 | 58.5 | 3.90 | 97.3 | 1.0 | 1.7 |
| 3 | 0.04 | 0.5 | 0.5 | 12.5 | 1.0 | 3.0 | 74.3 | 3.32 | 97.5 | 1.2 | 1.3 |
| 4 | 0.04 | 0.6 | 0.6 | 15.0 | 1.0 | 3.0 | 85.2 | 3.05 | 98.3 | 1.3 | 0.4 |
| 5 | 0.04 | 0.7 | 0.7 | 17.5 | 1.0 | 3.0 | 87.9 | 2.30 | 98.5 | 1.2 | 0.3 |

EXAMPLE 3

In a glass made polymerization tube, a mixture of triethyl aluminum (0.4 mmol) and a designed amount of benzotrifluoride in toluene (4 ml.) is heated at 70° C. for 30 minutes. A solution of 1,3-butadiene (4.0 mmol) in toluene (1.5 ml.) and a solution of nickel naphthenate (0.04 mmol) in toluene (0.4 ml.) are added thereto in this order, and the resulting mixture is stirred at 25° C. for 30 minutes. Moistened toluene (15.7 ml.) containing 550 p.p.m. of water is added thereto (the molar ratio of water to triethyl aluminum being 1.0), and the volume of the mixture is adjusted to 130 ml. with anhydrous toluene. The mixture is cooled to −10° C., and 1,3-butadiene (22 g.) is added thereto. Then, the polymerization tube is sealed. In the foregoing procedure, the whole operations are effected in a nitrogen stream. The polymerization tube is placed into a rotary constant bath of 40° C., and polymerization is executed for a designed time. The reaction mixture is then treated in the same manner as in Example 1.

The results are shown in Table 3.

added thereto in this order, and the resulting mixture is stirred at 25° C. for 30 minutes. Moistened toluene (157 ml.) containing 550 p.p.m. of water (the molar ratio of water to triethyl aluminum being 1.0) is added thereto, and the volume of the mixture is adjusted to 200 ml. with anhydrous toluene (13 ml.). The concentration of nickel naphthenate in the thus obtained catalyst solution is 0.04 mmol/20 ml.

In a glass made polymerization tube, a designed amount of the catalyst solution is charged in a nitrogen stream, and anhydrous toluene is added thereto to make 130 ml. After cooling to −10° C., 1,3-butadiene (22 g.) is added, and the polymerization tube is sealed. Then, the polymerization is executed in a rotary constant bath of 40° C. for a designed time, and the reaction mixture is treated in the same manner as in Example 1.

The results are shown in Table 4.

TABLE 4

| No. | Amount of— Catalyst solution (ml.) | Nickel naphthenate (mmol) | Molar ratio water: triethylaluminum: benzotrifluoride: nickel naphthenate | Polymerization time (hrs.) | Polymerization product | | | | |
|---|---|---|---|---|---|---|---|---|---|
| | | | | | Yield (percent) | [η] (dl./g.) | Micro structure (percent) | | |
| | | | | | | | Cis-1,4 | Trans-1,4 | 1,2 |
| 1 | 10 | 0.02 | 10:10:10:1 | 3.0 | 25.7 | 4.93 | 97.7 | 1.1 | 1.2 |
| 2 | 15 | 0.03 | 10:10:10:1 | 2.5 | 57.8 | 4.20 | 97.8 | 1.2 | 1.0 |
| 3 | 20 | 0.04 | 10:10:10:1 | 2.5 | 58.7 | 3.95 | 98.0 | 1.2 | 0.8 |
| 4 | 25 | 0.05 | 10:10:10:1 | 2.5 | 70.2 | 3.72 | 98.0 | 1.1 | 0.9 |
| 5 | 30 | 0.06 | 10:10:10:1 | 2.5 | 80.5 | 3.60 | 97.8 | 1.3 | 0.9 |

TABLE 3

| No. | Amount (mmol) | | Molar ratio of— | | | Polymerization time (hrs.) | Polymerization product | | | | |
|---|---|---|---|---|---|---|---|---|---|---|---|
| | Triethyl aluminum | Benzotrifluoride | Benzotrifluoride to triethyl aluminum | Triethyl aluminum to nickel naphthenate | Water to triethyl aluminum | | Yield (percent) | [η] (dl./g.) | Micro structure (percent) | | |
| | | | | | | | | | Cis-1,4 | Trans-1,4 | 1,2 |
| 1 | 0.40 | 0 | 0 | 10 | 1.0 | 10.0 | 0.5 | | | | |
| 2 | 0.40 | 0.04 | 0.1 | 10 | 1.0 | 5.0 | 25.0 | 3.72 | 97.2 | 1.0 | 1.8 |
| 3 | 0.40 | 0.12 | 0.3 | 10 | 1.0 | 3.0 | 82.0 | 3.93 | 97.4 | 1.2 | 1.4 |
| 4 | 0.40 | 0.20 | 0.5 | 10 | 1.0 | 3.0 | 81.0 | 4.20 | 98.3 | 1.0 | 0.7 |
| 5 | 0.40 | 0.40 | 1.0 | 10 | 1.0 | 3.0 | 82.7 | 4.10 | 98.0 | 1.3 | 0.7 |
| 6 | 0.40 | 0.80 | 2.0 | 10 | 1.0 | 3.0 | 80.3 | 4.15 | 98.2 | 1.1 | 0.7 |
| 7 | 0.40 | 4.00 | 10.0 | 10 | 1.0 | 3.0 | 80.5 | 4.12 | 98.0 | 1.0 | 1.0 |

EXAMPLE 4

In a glass made reaction tube, a solution of triethyl aluminum (4.0 mmol) in toluene (4.0 ml.) and a solution of benzotrifluoride (4.0 mmol) in toluene (10 ml.) are admixed and heated at 70° C. for 30 minutes. After the mixture is cooled to room temperature, a solution of 1,3-butadiene (40 mmol) in toluene (15 ml.) and a solution of nickel naphthenate (0.4 mmol) in toluene (1.0 ml.) are

EXAMPLE 5

The preparation of a catalyst composition and the polymerization of 1,3-butadiene are carried out in the same manner as in Example 1 except that a benzotrifluoride derivative is used as the component (C).

The results are shown in Table 5.

TABLE 5

| No. | Component (C)[1] | Polymerization time (hrs.) | Polymerization product | | | | |
|---|---|---|---|---|---|---|---|
| | | | Yield (percent) | [η] (dl./g.) | Micro structure (percent) | | |
| | | | | | Cis-1,4 | Trans-1,4 | 1,2 |
| 1 | o-Chlorobenzotrifluoride | 3.0 | 75.6 | 3.35 | 98.2 | 0.5 | 1.3 |
| 2 | p-Chlorobenzotrifluoride | 5.0 | 70.3 | 3.30 | 97.5 | 1.2 | 1.3 |
| 3 | o-Bromobenzotrifluoride | 5.0 | 72.7 | 3.25 | 97.3 | 1.0 | 1.7 |
| 4 | p-Bromobenzotrifluoride | 5.0 | 75.5 | 3.00 | 97.5 | 1.0 | 1.5 |
| 5 | 2,4-dichlorobenzotrifluoride | 5.0 | 73.2 | 3.10 | 97.8 | 0.8 | 1.4 |
| 6 | m-Trifluoromethylbenzotrifluoride | 5.0 | 72.5 | 3.12 | 98.0 | 1.3 | 0.7 |

[1] The molar ratio of nickel naphthenate:triethyl aluminum:the benzotrifluoride compound: water is 1:10:10:10.

EXAMPLE 6

The preparation of a catalyst composition and the polymerization of 1,3-butadiene are carried out in the same manner as in Example 1 but changing the nickel compound and/or the trialkyl aluminum compound.

The results are shown in Table 6.

TABLE 6

| | | | Polymeri- zation time (hrs.) | Polymerization product | | | | |
|---|---|---|---|---|---|---|---|---|
| | | | | Yield (percent) | [η] (dl./g.) | Micro structure (percent) | | |
| No. | Nickel compound | Trialkyl aluminum compound | | | | Cis-1,4 | Trans-1,4 | 1,2 |
| 1 | Nickel naphthenate | Tri-n-butyl aluminum | 3.0 | 42.0 | 3.25 | 97.4 | 1.7 | 0.9 |
| 2 | Nickel octenoate | Triethyl aluminum | 5.0 | 76.5 | 3.35 | 97.5 | 1.5 | 1.0 |
| 3 | do | Tri-n-butyl aluminum | 5.0 | 33.5 | 3.65 | 97.0 | 1.4 | 1.6 |
| 4 | Bis-acetylacetonate nickel | Triethyl aluminum | 5.0 | 45.7 | 3.92 | 97.3 | 1.6 | 1.1 |

NOTE.—The molar ratio of the nickel compound:the trialkyl aluminum compound:benzotrifluoride:water is 1:10:10:10

EXAMPLE 7

In a glass made pressure polymerization tube, there is charged a solution obtained by reacting triethyl aluminum (0.5 mmol) and benzotrifluoride (0.5 mmol) in toluene (2.0 ml.) at 70° C. for 30 minutes. A solution of 1,3-butadiene (5.0 mmol) in toluene (5.0 ml.) and a solution of nickel naphthenate (0.05 mmol) in toluene (0.5 ml.) are added thereto in this order, and the mixture is stirred at 25° C. for 30 minutes. A solution of the component (D) (0.5 mmol) in toluene (0.5 ml.) is added thereto, and the resultant mixture is stirred at 25° C. for 30 minutes. Anhydrous toluene is added thereto to make 50 ml. After the mixture is cooled to −10° C., 1,3-butadiene (10 g.) is added, and the polymerization tube is sealed. In the foregoing procedure, the whole operations are effected in a nitrogen stream. The polymerization tube is placed into a rotary constant temperature bath of 40° C., and polymerization is executed for a designed time. Then, the reaction mixture is poured into methanol containing a small amount of 2,6-di-t-butyl-p-cresol to stop the polymerization whereby the polymer is precipitated. The polymer is separated and dried at room temperature in vacuo.

The yield and the physical properties of the produced polymer are shown in Table 7.

EXAMPLE 8

In a glass made pressure polymerization tube, a solution of triethylaluminum (0.5 mmol) in toluene (5.0 ml.) is charged, and a solution of the component (C) (0.5 mmol) in toluene (0.5 ml.) is added thereto. The mixture is heated at 70° C. for 30 minutes. Then, a solution of 1,3-butadiene (5.0 mmol) in toluene (1.5 ml.) and a solution of nickel naphthenate (0.05 mmol) in toluene (0.5 ml.) are added thereto in this order, and the resultant mixture is stirred at 25° C. for 30 minutes. After further addition of a solution of 2,2,3,3-tetrafluoro-1-propanol (0.4 mmol) in toluene (0.4 ml.), the mixture is stirred at 25° C. for 30 minutes, and while cooling to −10° C., 1,3-butadiene (10 g.) is added. Then, the polymerization tube is sealed and placed into a rotary constant temperature bath of 40° C. to execute the polymerization. After a designed time, the reaction mixture is treated as in Example 8.

The yield and the physical properties of the produced polymer are shown in Table 8.

TABLE 8

| | | Polymeri- zation time (hrs.) | Polymerization product | | | | |
|---|---|---|---|---|---|---|---|
| | | | Yield (percent) | [η] (dl./g.) | Micro structure (percent) | | |
| No. | Component (C) | | | | Cis-1,4 | Trans-1,4 | 1,2 |
| 1 | o-Chlorobenzotrifluoride | 3.0 | 90.0 | 1.20 | 90.5 | 7.0 | 2.5 |
| 2 | m-Chlorobenzotrifluoride | 3.0 | 85.0 | 1.25 | 91.2 | 6.5 | 2.3 |
| 3 | o-Bromobenzotrifluoride | 3.0 | 70.2 | 1.53 | 88.3 | 7.6 | 4.1 |
| 4 | p-Bromobenzotrifluoride | 3.0 | 70.5 | 1.55 | 87.2 | 7.5 | 5.3 |
| 5 | 2,4-dichlorobenzotrifluoride | 3.0 | 88.3 | 1.27 | 90.4 | 6.2 | 3.7 |
| 6 | m-Trifluoromethylbenzotrifluoride | 3.0 | 90.2 | 1.08 | 91.3 | 6.0 | 2.4 |

EXAMPLE 9

In a glass made pressure polymerization tube, a solution of the trialkylaluminum compound (0.5 mmol) in toluene (5.0 ml.) is charged, and a solution of benzo-

TABLE 7

| | Component (D) | | | Polymerization product | | | | | |
|---|---|---|---|---|---|---|---|---|---|
| | | Molar ratio to triethyl aluminum | Polymeri- zation time (hrs.) | Yield (percent) | [η] (dl./g.) | Micro structure (percent) | | | Gel content (percent) |
| No. | Kind | | | | | Cis-1,4 | Trans-1,4 | 1,2 | |
| 1 | 2,2,3,3-tetrafluoro-1-propanol | 0.8 | 3.0 | 90 | 1.2 | 90.5 | 6.0 | 3.5 | 0.8 |
| 2 | 2,2,3,3,4,4,5,5-octafluoro-1-pentanol | 0.8 | 3.0 | 85 | 1.1 | 89.3 | 6.3 | 4.4 | 0.7 |
| 3 | 2,2,3,3,4,4,5,5,6,6,7,7-dodecafluoro-1-heptanol | 0.8 | 3.0 | 90 | 1.2 | 90.2 | 6.1 | 3.7 | 0.6 |
| 4 | Phenol | 1.0 | 10.0 | 57 | 2.5 | 89.3 | 7.6 | 3.1 | 1.2 |
| 5 | Malonic acid | 1.0 | 10.0 | 30 | 2.7 | 93.4 | 4.7 | 1.9 | 1.3 |
| 6 | Terephthalic acid | 1.0 | 10.0 | 20 | 1.5 | 89.5 | 7.5 | 3.0 | 1.5 |
| 7 | Benzaldehyde | 0.7 | 10.0 | 25 | 2.3 | 97.5 | 1.5 | 1.0 | 2.0 |
| 8 | Propionaldehyde | 0.7 | 10.0 | 35 | 2.3 | 96.0 | 1.8 | 2.2 | 2.5 |
| 9 | Pentachlorobenzaldehyde | 1.0 | 10.0 | 70 | 1.5 | 93.7 | 2.5 | 3.8 | 1.3 |
| 10 | Tetrachlorophthalic anhydride | 1.0 | 5.0 | 70 | 2.5 | 95.0 | 2.3 | 2.7 | 1.5 |
| 11 | Pyromellitic anhydride | 1.0 | 5.0 | 68 | 2.0 | 94.5 | 2.0 | 3.5 | 2.0 |
| 12 | Not added | | 10.0 | 0 | | | | | | trifluoride (0.5 mmol) in toluene (0.5 ml.) is added thereto. The mixture is heated at 70° C. for 30 minutes. Then, a solution of 1,3-butadiene (5.0 mmol) in toluene (1.5 ml.) and a solution of the nickel compound (0.05 mmol) in toluene (0.5 ml.) are added thereto in this order, and the resultant mixture is stirred at 25° C. for 30 minutes. After further addition of a solution of 2,2,3,3-tetrafluoro-1-propanol (0.4 mmol) in toluene (0.4 ml.), the mixture is stirred at 25° C. for 30 minutes, and the volume is adjusted to 50 ml. with anhydrous toluene. The mixture is cooled to −10° C., and 1,3-butadiene (10 g.) is added. Then, the polymerization tube is sealed and placed into a rotary constant temperature bath of 40° C. to execute the polymerization. After a designed time, the reaction mixture is treated as in Example 7.

The yield and the physical properties of the produced polymer are shown in Table 9.

ene (74 ml.) and a solution of nickel naphthenate (0.6 mmol) in toluene (6 ml.) are added thereto in this order. The resultant mixture is stirred at 25° C. for 30 minutes. A part of the mixture (10 ml.) is taken out and charged into a 200 ml. volume glass made pressure polymerization tube. A toluene solution of the component (F) is added thereto, and the resultant mixture is aged at 40° C. for 30 minutes. Toluene is added thereto to make 130 ml. After the mixture is cooled below −20° C., 1,3-butadiene (22 g.) is added, and the polymerization tube is sealed. In the foregoing procedure, the whole operations are effected in an argon stream. The polymerization tube is placed into a rotary constant temperature bath of 40° C., and polymerization is executed for a designed time. Then, the reaction mixture is poured into methanol containing a small amount of 2,6-di-t-butyl-p-cresol to stop the

TABLE 9

| No. | Nickel compound | Trialkyl aluminum compound | Polymerization time (hrs.) | Polymerization product | | | | |
|---|---|---|---|---|---|---|---|---|
| | | | | Yield (percent) | [η] (dl./g.) | Micro structure (percent) | | |
| | | | | | | Cis-1,4 | Trans-1,4 | 5,2 |
| 1 | Nickel naphthenate | Tri-n-butyl aluminum | 3.0 | 62.5 | 1.50 | 87.3 | 6.8 | 5.9 |
| 2 | Nickel octenoate | Triethyl aluminum | 3.0 | 83.4 | 1.02 | 90.0 | 6.2 | 3.8 |
| 3 | do | Tri-n-butyl aluminum | 3.0 | 43.8 | 1.10 | 87.4 | 7.3 | 5.3 |
| 4 | Bis-acetylacetonate nickel | Triethyl aluminum | 5.0 | 42.3 | 1.03 | 88.2 | 7.8 | 4.0 |

EXAMPLE 10

Using 2,2,3,3-tetrafluoro-1-propanol in a designed amount as the component (D), the preparation of a catalyst and the polymerization of 1,3-butadiene are carried out in the same manner as in Example 7.

The yield and the physical properties of the produced polymer are shown in Table 10.

polymerization whereby the polymer is precipitated. The polymer is separated and dried at room temperature in vacuo.

The yield and the physical properties of the produced polymer are shown in Table 11.

TABLE 11

| No. | Component (F) | | Polymerization time (hrs.) | Polymerization product | | | | |
|---|---|---|---|---|---|---|---|---|
| | Kind | Amount[1] | | Yield (percent) | [η] (dl./g.) | Micro structure (percent) | | |
| | | | | | | Cis-1,4 | Trans-1,4 | 1,2 |
| 1 | Trichloroacetic acid | 2.0 | 15.0 | 62.8 | 1.35 | 93.2 | 4.0 | 2.8 |
| 2 | Trichloroacetic anhydride | 2.0 | 15.0 | 63.5 | 1.25 | 92.5 | 3.2 | 4.3 |
| 3 | Tetrachlorophthalic anhydride | 2.0 | 15.0 | 52.5 | 1.20 | 87.3 | 5.6 | 7.1 |
| 4 | α,α,α-Trichloroacetone | 3.0 | 15.0 | 50.3 | 1.15 | 87.5 | 6.0 | 6.5 |
| 5 | p-Hydroxybenzaldehyde | 5.0 | 8.0 | 16.8 | 3.64 | 94.8 | 2.4 | 2.8 |

[1] The molar ratio to 0.06 mmol of nickel naphthenate.

EXAMPLE 12

The preparation of a catalyst composition and the polymerization of 1,3-butadiene by the use of the obtained catalyst composition are executed in the same manner as in Example 11 except that the amounts of nickel naphthenate and diethyl aluminum monofluoride are changed respectively to 0.04 mmol and 0.4 mmol and the aging of the catalyst composition is performed at 40° C. for 15 minutes.

The results are shown in Table 12.

TABLE 10

| No. | Amount of— | | Molar ratio of 2,2,3,3-tetrafluoro-1-propanol to triethyl aluminum | Polymerization time (hrs.) | Polymerization product | | | | |
|---|---|---|---|---|---|---|---|---|---|
| | 2,2,3,3-tetrafluoro-1-propanol (mmol) | Triethyl aluminum (mmol) | | | Yield (percent) | [η] (dl./g.) | Micro structure (percent) | | |
| | | | | | | | Cis-1,4 | Trans-1,4 | 1,2 |
| 1 | 0 | 0.50 | 0 | 10.0 | 0 | | | | |
| 2 | 0.05 | 0.50 | 0.1 | 10.0 | 35.2 | 1.28 | 90.0 | 6.2 | 3.8 |
| 3 | 0.25 | 0.50 | 0.5 | 5.0 | 70.0 | 1.25 | 89.7 | 6.0 | 4.3 |
| 4 | 0.50 | 0.50 | 1.0 | 3.0 | 90.0 | 1.10 | 90.3 | 6.1 | 3.6 |
| 5 | 0.75 | 0.50 | 1.5 | 3.0 | 95.2 | 1.05 | 89.5 | 6.4 | 4.1 |

EXAMPLE 11

In a glass made reaction tube, a solution of diethyl aluminum monofluoride (6 mmol) in toluene (20 ml.) is charged, and a solution of 1,3-butadiene (2.4 g.) in tolu-

TABLE 12

| No. | Component (F) | | Polymerization time (hrs.) | Polymerization product | | | | |
|---|---|---|---|---|---|---|---|---|
| | Kind | Amount[1] | | Yield (percent) | [η] (dl./g.) | Micro structure (percnet) | | |
| | | | | | | Cis-1,4 | Trans-1,4 | 1,2 |
| 1 | p-Trichloromethylphenol | 1.0 | 10.0 | 43.6 | 1.25 | 93.2 | 2.8 | 4.0 |
| 2 | Terephthalaldehyde | 5.0 | 8.0 | 16.8 | 4.04 | 93.7 | 3.4 | 2.9 |

[1] The molar ratio to 0.04 mmol of nickel naphthenate.

EXAMPLE 13

The preparation of a catalyst composition is executed in the same manner as in Example 11 except that the amounts of diethylaluminum monofluoride and nickel naphthenate are changed respectively to 0.5 mmol and 0.05 mmol and the volume of the catalyst solution is adjusted to 50 ml. Then the polymerization of 1,3-butadiene is performed using the above obtained catalyst composition in a 100 ml. volume glass made pressure polymerization tube as in Example 11.

The results are shown in Table 13.

TABLE 13

| No. | Component (F) Kind | Amount[1] | Polymerization time (hrs.) | Yield (percent) | [η] (dl./g.) | Micro structure (percent) Cis-1,4 | Trans-1,4 | 1,2 |
|---|---|---|---|---|---|---|---|---|
| 1 | 3,3,2,2-tetrachloropropionic acid | 5 | 15 | 68.2 | 0.85 | 94.2 | 2.5 | 2.3 |
| 2 | Benzaldehyde | 7 | 5 | 9.8 | 2.13 | 91.3 | 3.6 | 5.1 |
| 3 | Propionaldehyde | 7 | 5 | 6.6 | 2.15 | 96.8 | 1.1 | 2.1 |
| 4 | Pentachlorobenzaldehyde | 10 | 5 | 24.3 | 1.42 | 97.0 | 1.5 | 1.5 |
| 5 | Chloral | 10 | 15 | 13.8 | 2.03 | 92.3 | 2.8 | 4.9 |
| 6 | 3,3,2,2-tetrachloropropanol | 10 | 15 | 30.5 | 1.73 | 92.3 | 3.0 | 4.7 |
| 7 | Phenol | 10 | 5 | 16.3 | 2.23 | 90.0 | 8.1 | 1.9 |
| 8 | Tetrabromophenol | 10 | 5 | 83.8 | 0.58 | 91.3 | 6.7 | 2.0 |

[1] The molar ratio to 0.05 mmol of nickel naphthenate.

EXAMPLE 14

In a glass made polymerization tube, a solution of diethyl aluminum monofluoride (0.5 mmol) in toluene (2.0 ml.) is charged, and a solution of 1,3-butadiene (5.0 mmol) in toluene (1.5 ml.) and a solution of nickel naphthenate (0.05 mmol) in toluene (0.4 ml.) are added thereto in this order. The resultant mixture is stirred at 25° C. for 30 minutes. After addition of a designed amount of moistened toluene containing 550 p.p.m. of water, the volume of the mixture is adjusted to 50 ml. with anhydrous toluene. The resultant mixture is cooled below −10° C., and 1,3-butadiene (10 g.) is supplied therein. The polymerization tube is sealed, and polymerization is executed as in Example 11.

The results are shown in Table 14.

TABLE 14

| No. | Molar ratio of water to diethylaluminum monofluoride | Polymerization times (hrs.) | Yield (percent) | [η] (dl./g.) | Micro structure (percent) Cis-1,4 | Trans-1,4 | 1,2 | Gel content (percent) |
|---|---|---|---|---|---|---|---|---|
| 1 | 0 | 10.0 | 0 | | | | | |
| 2 | 0.10 | 10.0 | 0.2 | 0.73 | 97.3 | 0.4 | 2.3 | 0.80 |
| 3 | 0.25 | 5.0 | 3.0 | 1.02 | 97.5 | 0.5 | 2.0 | 0.73 |
| 4 | 0.35 | 5.0 | 4.0 | 1.46 | 98.2 | 0.7 | 1.1 | 0.80 |
| 5 | 0.50 | 3.0 | 37.5 | 2.73 | 98.3 | 0.5 | 1.2 | 0.85 |
| 6 | 1.00 | 3.0 | 75.6 | 3.35 | 98.2 | 0.5 | 1.3 | 0.70 |
| 7 | 1.20 | 3.0 | 70.0 | 3.91 | 98.4 | 0.4 | 1.2 | 0.92 |
| 8 | 1.50 | 3.0 | 45.2 | 4.05 | 98.2 | 0.7 | 1.1 | 1.03 |
| 9 | 2.00 | 5.0 | 0.5 | 5.73 | 97.3 | 0.8 | 1.9 | 1.05 |

EXAMPLE 15

In a 100 ml. volume glass made pressure polymerization tube, triethylaluminum (0.5 mmol) is admixed with a solution of benzoyl fluoride (0.5 mmol) in toluene (2.0 ml.), and the mixture is reacted at 25° C. for 1 hour. A solution of 1,3-butadiene (5.0 mmol) in toluene (5.0 ml.) and a solution of nickel naphthenate (0.05 mmol) in toluene (5.0 ml.) are added thereto in this order while ice-cooling. After the resulting mixture is stirred at 25° C. for 30 minutes, the component (F) is added thereto. Then, polymerization is executed as in Example 11.

The results are shown in Table 15.

TABLE 15

| No. | Component (F) Kind | Amount[1] | Polymerization time (hrs.) | Yield (percent) | [η] (dl./g.) | Micro structure (percent) Cis-1,4 | Trans-1,4 | 1,2 |
|---|---|---|---|---|---|---|---|---|
| 1 | Water | 8.0 | 3.0 | 80.0 | 3.30 | 94.0 | 2.1 | 3.4 |
| 2 | Tetrachlorohydroquinone | 1.0 | 3.0 | 90.0 | 2.53 | 93.5 | 2.0 | 4.5 |
| 3 | Pentachlorophenol | 2.0 | 5.0 | 37.2 | 2.20 | 93.8 | 2.3 | 3.9 |

[1] The molar ratio to 0.05 mmol of nickel naphthenate.

EXAMPLE 16

A solution of the component (G) (10 mmol) in toluene (10 ml.) is admixed with a solution of triethylaluminum (10 mmol) in toluene (9.2 ml.), and the mixture is heated at 100° C. for 1 hour in a nitrogen stream. A part of the reaction mixture (5 ml.) is taken out and charged into a glass made pressure polymerization tube. A 20% toluene solution of butadiene (3 ml.) and a solution of nickel naphthenate (0.1 mmol) in toluene (1.0 ml.) are added thereto while ice-cooling in a nitrogen stream, and the mixture is stirred at room temperature for 15 minutes and then aged at 40° C. for 15 minutes. After the mixture is cooled to room temperature, dry toluene (46 ml.) is added, and the temperature is lowered to −10° C. Liquified butadiene (16 ml.) is added thereto in a nitrogen stream. The polymerization tube is sealed, and the polymerization is executed at 40° C.

The results are shown in Table 16.

TABLE 16

| No. | Component (G) Kind | Amount[1] | Polymerization time (hrs.) | Yield (percent) | [η] (dl./g.) | Micro structure (percent) Cis-5,4 | Trans-1,4 | 1,2 |
|---|---|---|---|---|---|---|---|---|
| 1 | 1,2-dichloro-3,3-difluoropropylene | 10.0 | 5.0 | 57.0 | 2.7 | 86.3 | 6.8 | 6.9 |
| 2 | β,β,β-Trichloroacetaldehyde | 10.0 | 10.0 | 32.5 | 1.23 | 83.0 | 12.0 | 5.0 |
| 3 | α,α,α-Trichloroacetone | 10.0 | 10.0 | 42.0 | 1.20 | 85.0 | 9.5 | 5.4 |
| 4 | Trichloroacetaldehyde hemi-acetal | 10.0 | 10.0 | 17.0 | 0.73 | 84.0 | 9.0 | 7.0 |

[1] The molar ratio to 0.1 mmol of nickel naphthenate.

EXAMPLE 17

In a glass made pressure polymerization tube, there is charged a solution obtained by reacting triethylaluminum (0.5 mmol) and benzoyl fluoride (0.5 mmol) in toluene (2.0 ml.) at 25° C. for 1 hour. A solution of 1,3-butadiene (5.0 mmol) in toluene (5 ml.) and a solution of nickel naphthenate (0.05 mmol) in toluene (5.0 ml.) are added thereto in this order while ice-cooling, and the mixture is stirred at 25° C. for 30 minutes. After addition of tetrachlorohydroquinone (0.25 mmol) in toluene (5 ml.), the mixture is aged at 25° C. for 30 minutes. A designed amount of moistened toluene containing 550 p.p.m. of water is added thereto, and the volume of the mixture is adjusted to 50 ml. with anhydrous toluene. The temperature is lowered to −10° C., and 1,3-butadiene (10 g.) is supplied in the polymerization tube. The polymerization is executed as in Example 11.

The results are shown in Table 17.

TABLE 17

| No. | Molar ratio of water to triethyl aluminum | Polymerization time (hrs.) | Polymerization product | | | | |
|---|---|---|---|---|---|---|---|
| | | | Yield (percent) | [η] (dl./g.) | Micro structure (percent) | | |
| | | | | | Cis-1,4 | Trans-1,4 | 1,2 |
| 1 | 0 | 3.0 | 92.0 | 2.03 | 93.8 | 2.7 | 3.5 |
| 2 | 0.3 | 3.0 | 95.7 | 2.30 | 94.0 | 2.6 | 3.4 |
| 3 | 0.5 | 3.0 | 97.0 | 3.00 | 93.5 | 2.8 | 3.7 |
| 4 | 0.8 | 3.0 | 90.2 | 3.25 | 93.0 | 2.8 | 4.2 |
| 5 | 1.0 | 3.0 | 85.3 | 3.30 | 93.5 | 2.6 | 3.9 |
| 6 | 1.3 | 3.0 | 50.2 | 3.50 | 92.0 | 3.2 | 4.8 |

What is claimed is:

1. A process for producing butadiene polymer which comprises polymerizing 1,3-butadiene in the presence of a catalyst system comprising:
   (A) at least one nickel compound selected from the group consisting of the halides, sulfates, organic acid salts, complex compounds, organic coordination compounds and chelate compounds thereof,
   (B) a trialkylaluminum compound,
   (C) at least one of the benzotrifluoride compounds represented by the formula:

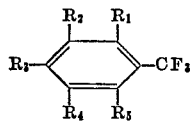

wherein $R_1$, $R_2$, $R_3$, $R_4$ and $R_5$ are each hydrogen, halogen, alkyl or fluoroalkyl, and
   (D) at least one member selected from the group consisting of
       (D-3) water,
       (D-2) halogenated aliphatic alcohols,
       (D-3) phenols, naphthols and their halogen derivatives,
       (D-4) aliphatic or aromatic aldehydes and their halogen derivatives, and
       (D-5) aromatic polycarboxylic anhydrides and their halogen derivatives,
   to give a butadiene polymer containing predominantly a cis-1,4 structure.

2. The process according to claim 1, wherein the molar ratios of the trialkylaluminum compound to the nickel compound, the benzotrifluoride compound to the trialkylaluminum compound, water to the trialkylaluminum compound and, the halogenated aliphatic alcohol (D-2), the phenol and naphthol and their halogen derivatie (D-3), the aliphatic or aromatic aldehyde and its halogen derivative (D-4) and/or the aromatic polycarboxylic anhydride and its halogen derivative (D-5) to the trialkylaluminum compound are 0.5 to 1000, 0.1 to 100, 0.25 to 1.5 and 0.05 to 20, respectively.

3. The process according to claim 1, wherein said molar ratios are 1.0 to 100, 0.2 to 10, 0.25 to 1.5 and 0.1 to 10, respectively.

4. The process according to claim 1, wherein the nickel compound is used in an amount of 0.0005 to 2 mmol based on 1 mol of monomeric 1,3-butadiene.

5. The process according to claim 1, wherein the polymerization is carried out in a liquid medium at a temperature from −30 to 150° C.

6. The process according to claim 1, wherein the nickel compound is an organic acid salt selected from the group consisting of nickel acetate, nickel naphthenate and nickel octanoate.

7. The process according to claim 1, wherein the nickel compound is a complex compound, organic coordination compound or chelate compound selected from the group consisting of nickel chloride-pyridine complex, tris(dipyridyl)nickel chloride, bis(ethylenediamine) nickel sulfate, bis-dimethylglyoxymato nickel, bis-ethylacetaoacetate nickel and bis-acetylacetonate nickel.

8. The process according to claim 1, wherein the benzotrifluoride compound is selected from the group consisting of benzotrifluoride,
2-, 3- or 4-chlorobenzotrifluoride,
2-, 3- or 4-bromobenzotrifluoride,
2,5-dichlorobenzotrifluoride,
3,4-dichlorobenzotrifluoride,
2,3-dibromobenzotrifluoride,
2,5-trifluorobenzotrifluoride,
3,5-difluorobenzotrifluoride,
2-, 3- or 4-methylbenzotrifluoride,
2- or 4-hexylbenzotrifluoride,
2- or 4-dodecylbenzotrifluoride,
2-monofluoromethylbenzotrifluoride,
3-difluoromethylbenzotrifluoride,
1,3-bis(trifluoromethyl) benzene,
3-(3'-fluoropropyl)benzotrifluoride,
4-(2',3'-difluoropropyl)benzotrifluoride,
1,3,5-tris-(trifluoromethyl)benzene,
2-methyl-4-chlorobenzotrifluoride,
3-bromo-4-ethylbenzotrifluoride,
2-methyl-4-trifluoromethylbenzotrifluoride, and
3-fluoro-4-trifluoromethylbenzotrifluoride.

References Cited
UNITED STATES PATENTS 3,649,605  3/1972  Throckmorton ____ 260—94.3 X
3,681,315  8/1972  Yagi et al. _____ 260—94.3

JOSEPH L. SCHOFER, Primary Examiner
W. F. HAMROCK, Assistant Examiner

U.S. Cl. X.R.
252—429 B